United States Patent
Refuah et al.

(10) Patent No.: US 7,631,032 B1
(45) Date of Patent: Dec. 8, 2009

(54) PERSONALIZED INTERNET INTERACTION BY ADAPTING A PAGE FORMAT TO A USER RECORD

(75) Inventors: Aviv Refuah, Tel-Aviv (IL); Zeev Refuah, Tel-Aviv (IL); Eli Nhaissi, Old Westbury, NY (US); Maier Fenster, Petach Tikva (IL)

(73) Assignee: Net-Express, Ltd., Petach Tikva (IL)

( * ) Notice: Subject to any disclaimer, the term of this patent is extended or adjusted under 35 U.S.C. 154(b) by 0 days.

(21) Appl. No.: 09/601,385

(22) PCT Filed: Jan. 28, 1999

(86) PCT No.: PCT/IL99/00056

§ 371 (c)(1),
(2), (4) Date: Jul. 28, 2000

(87) PCT Pub. No.: WO99/39281

PCT Pub. Date: Aug. 5, 1999

(30) Foreign Application Priority Data

Jan. 30, 1998 (IL) .................................. 123129
Jul. 20, 1998 (IL) .................................. 125432

(51) Int. Cl.
*G06F 15/16* (2006.01)

(52) U.S. Cl. .................. 709/201; 709/218; 709/228; 380/23

(58) Field of Classification Search ................ 709/206, 709/217, 218, 220, 224, 227, 228, 203, 229, 709/232, 201, 223; 705/116, 34, 1, 10, 14; 370/251; 713/201, 202; 707/10
See application file for complete search history.

(56) References Cited

U.S. PATENT DOCUMENTS

| | | | |
|---|---|---|---|
| 2,769,024 | A | 10/1956 | Del Riccio et al. |
| 4,870,579 | A | 9/1989 | Hey |
| 4,996,642 | A | 2/1991 | Hey |

(Continued)

FOREIGN PATENT DOCUMENTS

EP 0 387 226 9/1990

(Continued)

OTHER PUBLICATIONS

Falk, A. et al.; "PAWS: An Agent for WWW-Retrieval and Filtering"; Proceedings of the International Conference on The Practical Application of Intelligent Agents and Multi-Agent Technology; Apr. 22, 1996; pp. 169-179; XP002037595.

(Continued)

*Primary Examiner*—Khanh Q Dinh
(74) *Attorney, Agent, or Firm*—Ostrager Chong Flaherty & Broitman PC

(57) ABSTRACT

A method of a user interacting with an Internet, comprising: tracking interactions of the user with an Internet; analyzing said tracked interactions to determine at least one aspect of a user's interaction with the Internet; and modifying future interactions of said user with said Internet, responsive to said determined aspect, wherein said modified interactions comprise site-content related interactions with a plurality of unrelated sites. Preferably, the aspect is adapted in real-time to reflect changes in the tracked interactions.

34 Claims, 2 Drawing Sheets

U.S. PATENT DOCUMENTS

| | | | |
|---|---|---|---|
| 5,105,268 A | 4/1992 | Yamanouchi et al. | |
| 5,446,891 A | 8/1995 | Kaplan et al. | 709/216 |
| 5,577,109 A | 11/1996 | Stimson et al. | |
| 5,644,724 A | 7/1997 | Cretzler | |
| 5,659,732 A | 8/1997 | Kirsch | |
| 5,671,342 A | 9/1997 | Millier et al. | |
| 5,721,827 A | 2/1998 | Logan et al. | |
| 5,721,902 A | 2/1998 | Schultz | |
| 5,722,067 A | 2/1998 | Fougnies et al. | |
| 5,727,950 A | 3/1998 | Cook et al. | |
| 5,732,219 A | 3/1998 | Blumer et al. | |
| 5,737,734 A | 4/1998 | Schultz | |
| 5,742,768 A | 4/1998 | Gennaro et al. | |
| 5,745,556 A | 4/1998 | Ronen | |
| 5,749,075 A | 5/1998 | Toader et al. | |
| 5,761,280 A | 6/1998 | Noonen et al. | |
| 5,761,499 A | 6/1998 | Sonderegger | |
| 5,764,906 A | 6/1998 | Edelstein et al. | 705/32 |
| 5,768,521 A | 6/1998 | Dedrick | |
| 5,768,578 A | 6/1998 | Kirk et al. | |
| 5,769,906 A | 6/1998 | Kremer et al. | |
| 5,774,664 A | 6/1998 | Hidary et al. | |
| 5,794,210 A | 8/1998 | Goldhaber et al. | |
| 5,796,832 A | 8/1998 | Kawan | |
| 5,799,063 A | 8/1998 | Krane | |
| 5,806,043 A | 9/1998 | Toader | |
| 5,812,776 A | 9/1998 | Gifford | |
| 5,815,665 A | 9/1998 | Teper et al. | |
| 5,819,092 A | 10/1998 | Ferguson et al. | |
| 5,848,396 A * | 12/1998 | Gerace | 705/10 |
| 5,852,812 A | 12/1998 | Reeder | |
| 5,862,325 A | 1/1999 | Reed et al. | |
| 5,878,219 A | 3/1999 | Vance, Jr. et al. | |
| 5,884,262 A | 3/1999 | Wise et al. | |
| 5,892,919 A | 4/1999 | Nielsen | |
| 5,898,830 A | 4/1999 | Wesinger, Jr. et al. | |
| 5,898,835 A | 4/1999 | Truong | |
| 5,902,252 A | 5/1999 | Hohlfeld et al. | |
| 5,902,353 A | 5/1999 | Reber et al. | |
| 5,903,729 A | 5/1999 | Reber et al. | |
| 5,907,680 A | 5/1999 | Nielsen | |
| 5,911,145 A * | 6/1999 | Arora et al. | 715/514 |
| 5,915,093 A | 6/1999 | Berlin et al. | |
| 5,920,848 A | 7/1999 | Schutzer et al. | |
| 5,958,008 A * | 9/1999 | Pogrebisky et al. | 709/223 |
| 5,968,125 A | 10/1999 | Garrick et al. | |
| 5,970,477 A | 10/1999 | Roden | |
| 5,974,453 A | 10/1999 | Andersen et al. | |
| 5,987,440 A * | 11/1999 | O'Neil et al. | 705/44 |
| 5,987,506 A | 11/1999 | Carter et al. | |
| 5,991,735 A * | 11/1999 | Gerace | 705/10 |
| 6,009,459 A | 12/1999 | Belfiore et al. | |
| 6,021,496 A * | 2/2000 | Dutcher et al. | 713/202 |
| 6,023,698 A | 2/2000 | Lavey, Jr. et al. | |
| 6,029,195 A * | 2/2000 | Herz | 725/116 |
| 6,035,334 A * | 3/2000 | Martin et al. | 709/228 |
| 6,061,738 A | 5/2000 | Osaku et al. | |
| 6,070,157 A | 5/2000 | Jacobson et al. | |
| 6,097,441 A * | 8/2000 | Allport | 348/552 |
| 6,098,065 A | 8/2000 | Skillen et al. | |
| 6,101,482 A * | 8/2000 | DiAngelo et al. | 705/26 |
| 6,151,624 A | 11/2000 | Teare et al. | |
| 6,199,054 B1 | 3/2001 | Khan et al. | |
| 6,243,816 B1* | 6/2001 | Fang et al. | 726/5 |
| 6,275,824 B1* | 8/2001 | O'Flaherty et al. | 707/9 |
| 6,292,551 B1 | 9/2001 | Entman et al. | |
| 6,310,873 B1 | 10/2001 | Rainis et al. | |
| 6,332,158 B1 | 12/2001 | Risley et al. | |
| 6,356,936 B1* | 3/2002 | Donoho et al. | 709/206 |
| 6,397,219 B2 | 5/2002 | Mills | |
| 6,446,260 B1 | 9/2002 | Wilde et al. | |
| 6,446,261 B1* | 9/2002 | Rosser | 725/34 |
| 6,453,335 B1* | 9/2002 | Kaufmann | 709/203 |
| 6,480,850 B1* | 11/2002 | Veldhuisen | 707/9 |
| 6,507,872 B1 | 1/2003 | Geshwind | |
| 6,546,002 B1* | 4/2003 | Kim | 370/351 |
| 6,546,399 B1 | 4/2003 | Reed et al. | |
| 6,556,217 B1* | 4/2003 | Makipaa et al. | 345/667 |
| 6,571,279 B1* | 5/2003 | Herz et al. | 709/217 |
| 6,574,629 B1* | 6/2003 | Cooke et al. | 707/10 |
| 6,640,284 B1* | 10/2003 | Shaw et al. | 711/129 |
| 6,668,177 B2* | 12/2003 | Salmimaa et al. | 455/566 |
| 6,671,818 B1* | 12/2003 | Mikurak | 714/4 |
| 6,735,701 B1 | 5/2004 | Jacobson | |
| 6,799,063 B2 | 9/2004 | Carson | |
| 6,853,993 B2 | 2/2005 | Ortega et al. | |
| 7,240,022 B1* | 7/2007 | Bistriceanu et al. | 705/14 |
| 7,289,971 B1* | 10/2007 | O'Neil et al. | 705/44 |
| 7,334,013 B1* | 2/2008 | Calinov et al. | 709/201 |
| 2001/0011222 A1* | 8/2001 | Mclauchlin et al. | 705/1 |
| 2002/0184534 A1 | 12/2002 | Rangan et al. | |
| 2005/0203835 A1 | 9/2005 | Nhaissi et al. | |

FOREIGN PATENT DOCUMENTS

| | | |
|---|---|---|
| EP | 0 643 541 | 3/1995 |
| EP | 0 749 081 | 12/1996 |
| EP | 1051683 | 11/2000 |
| GB | 2312975 | 11/1997 |
| JP | HEI09-305518 | 11/1997 |
| JP | HEI09-319767 | 12/1997 |
| JP | HEI10-021259 | 1/1998 |
| WO | WO 96/23265 | 8/1996 |
| WO | 9642041 | 12/1996 |
| WO | WO 97/07656 | 3/1997 |
| WO | 9719564 | 5/1997 |
| WO | WO 97/26612 | 7/1997 |
| WO | WO 97/31490 | 8/1997 |
| WO | WO 97/41673 | 11/1997 |
| WO | WO 98/04088 | 1/1998 |
| WO | 9826381 | 6/1998 |
| WO | WO 98/53581 | 11/1998 |
| WO | WO 99/39275 | 8/1999 |
| WO | WO 99/39280 | 8/1999 |
| WO | WO 99/39281 | 8/1999 |
| WO | WO 00/05684 | 2/2000 |
| WO | WO 01/06393 | 1/2001 |

OTHER PUBLICATIONS

Kamba, T. et al.; "Anatagonomy: A Personalized Newspaper on The World Wide Web"; International Journal of Human-Computer Studies; vol. 46; Jan. 1, 1997, pp. 789-803; XP 002086827.

Davison, A.; "A Graphical Internet Chat"; Web Techniques; Jan. 1998; Miller Freeman; USA; vol. 3; No. 1; pp. 54-57; XP002117568.

Duerst, M.; "Internationalization of Domain Names;" Jul. 1998.

Hahn, M.; "Uniform Resource Locators;" Dec. 1, 1995; EDPACS; vol. 3, No. 6; pp. 8-13, XP000566203.

Takada, T.; "Multilingual Information Exchange Through the World-Wide Web;" Nov. 1, 1994; Computer Networks and ISDN Systems; vol. 27, No. 2; pp. 235-241; XP004037994.

Cummings, R, "A URL Alternative", Sep. 12, 1997, keyword.com press release.

Auric Web Systems "The Intercard System. Prepaid Internet Access Cards", Auric Web Systems, 17 p., 1998.

Davies et al. "Networked Information Management", BT Technology Journal, 15(2): 194-208, 1998.

Estabrook "Sams' Teach Yourself Microsoft Internet Explorer 4 in 24 Hours", Sams.Net Publishing, Hour 6 & 9: 83-85, 131-132, 1997.

Lee "Microsoft Internet Explorer PowerToys", The Naked PC Newsletter (TNPC), 3 p., 1998.

Wong "Web Client Programming With Perl", O'Reilly Online Catalog, 5 p., 1997. Retrieved From the Internet: URL: http://www.orielly.com/openbook/webclient/ch01.html.

Moran, Joseph, "Using Windows 98's Address Bar to its Potential".

Soria et al. "Cytosolic Calcium Oscillations and Insulin Release in Pancreatic Islets of Langerhans", Diabetes & Metabolism, 24: 37-40, 1998.

W3C, Line Mode Browser Commands, Dec. 9, 1996.

Schloss, R. J., "Novel Business Uses of Independently Created Hyperlinks in the World Wide Web: Basic Mechanism and Examples," Proceedings of the Annual Hawaii International Conference on System Sciences, 1996, pp. 137-146.

Canadian Patent Office Action dated Sep. 10, 2008, in Canadian patent application No. 2,319,750 to Net-Express Ltd., entitled "WWW Addressing."

European Patent Office Examination Report Dated Oct. 9, 2007, in European Patent Application No. 99 901 873.2-2221 to Net-Express Ltd., entitled "WWW Addressing".

European Patent Office Examination Report Dated Mar. 12, 2004, in European Patent Application No. 99 901 873.2-2221 to Net-Express Ltd., entitled "WWW Addressing".

International Search Report dated Nov. 18, 1999, in International Patent Application No. PCT/IL99/00055 entitled "WWW Addressing".

International Preliminary Examination Report dated May 11, 2000, in International Patent Application No. PCT/IL99/00055 entitled "WWW Addressing".

Written Opinion dated Jan. 5, 2000, in International Patent Application No. PCT/IL99/00055 entitled "WWW Addressing".

Invitation to Pay Additional Fees dated Jul. 2, 1999, in International Patent Application No. PCT/IL99/00055 entitled "WWW Addressing".

International Preliminary Examination Report dated May 22, 2000, in International Patent Application No. PCT/IL99/00056, entitled "Personalized Internet Interaction".

Written Opinion dated Dec. 2, 1999, in International Patent Application No. PCT/IL99/00056, entitled "Personalized Internet Interaction".

Invitation to Pay Additional Fees dated Jul. 2, 1999 in International Patent Application No. PCT/IL99/00056, entitled "Personalized Internet Interaction".

Examination Report dated Nov. 28, 2007, in European Patent Application No. 99 933 101.0-1225, entitled "Internet Billing".

Supplementary European Search Report dated Jan. 23, 2007, in European Patent Application No. 99 933 101.0-1225, entitled "Internet Billing".

Corrected International Search Report dated Apr. 26, 2000, in International Patent Application No. PCT/IL99/00399, entitled "Internet Billing".

International Search Report dated Feb. 8, 2000, in International Patent Application No. PCT/IL99/00399, entitled "Internet Billing".

International Preliminary Examination Report dated Jun. 26, 2001, in International Patent Application No. PCT/IL99/00399, entitled "Internet Billing".

Written Opinion dated Jul. 27, 2000, in International Patent Application No. PCT/IL99/00399, entitled "Internet Billing".

International Search Report dated Dec. 22, 1999, in International Patent Application No. PCT/IL99/00433, entitled "User Interface Method".

"What Are Networds", Internet Archive, Oct. 15, 1997, http://www.web.archive.org/web/19971015221524/www.netword.com/n/help/what.html.

"Google Beta", Dec. 2, 1998, http://web.archive.org/web/19981202230410/http://www.google.com/.

Japanese Foreign Patent Office Action for Japanese Patent Application No. 2000-529668 dated Jul. 7, 2008.

Kikui et al, "Multiple Language Function in Navigation of Internet Information", Symp Application of Natural Lang Process, Information Processing Soc, Oct. 19, 1995, vol. 95, No. 6, pp. 97-105.

Sakamoto et al, "URL Number (Hot Code) Converting Server on Internet", NTT Technical J, Oct. 1, 1997, vol. 9, No. 10, pp. 92-94.

Yergeau, P. et al.; "Internationalization of URLs;" Sep. 9, 1996; pp. 1-3; Retrieved from Internet: <http://www.alis-com:8085/~yergeau/url-00.html>.

Lee "Microsoft Internet Explorer PowerToys", The Naked PC Newsletter (TNPC), 3 P., 1998.

Brin et al., "The Anatomy of a Large-Scale Hypertextual Web Search Engine," Computer Science Department, Stanford University, 1998, 20 pages.

Armstrong et al "WebWatcher: A Learning Apprentice for the World Wide Web," School of Computer Science, Carnegie Mellon University, 1995, 7 pages.

"Surfin' the World Wide Web with Japanese," by K. Kondo and C. Hemphill, Proceedings of the 1997 IEEE International Conference on Acoustics, Speech, and Signal Processing, vol. 2.

J. Kornblum: "N.Y. Times tries pop-up ads" CNET News. COM,—Jan. 16, 1998 (Jan. 16, 1998) XP002297192, Retrieved from the Internet: URL:http://news.cnet.com/2100-1023-207188.html, retrieved on Oct. 6, 2009.

W3C: "HTML 3.2 Reference Specification"—1997 XP002968017, retrieved from the Internet:URL:http://www.w3.org/TR/REC-html32, retrieved on Oct. 6, 2009.

"Changing url of a web site—meta refresh" Apr. 2, 1997 (Apr. 2, 1997), XP007909426, retrieved from the Internet:URL: http://lists.webjunction.org/wjlists/web4lib/1997-April/017651.html, retrieved on Oct. 6, 2009.

Inoue, Still not too late for Internet [8] Using Internet Explorer 3.0 (Part 2) (Inoue, Imakara-demo osokunai Internet [dai 8 kai] Internet Explorer 3. 0 wo tukau (2)), pp. 292-295, Nikkei Personal Computer, No. 281, Jan. 27, 1997, Nikkei BP (Dispatch No. 601380).

* cited by examiner

US 7,631,032 B1

PERSONALIZED INTERNET INTERACTION BY ADAPTING A PAGE FORMAT TO A USER RECORD

RELATED APPLICATION

This application is a US national filing of PCT Application PCT/IL99/00056, filed Jan. 28, 1999.

FIELD OF THE INVENTION

The present invention is related to the field of Internet information searching and download and in particular to personalizing interaction with an Internet.

BACKGROUND OF THE INVENTION

The Internet contains an enormous amount of information. Several methods have been developed for searching the Internet for a particular piece of information. These include:

(a) Yellow pages. Each web site is hierarchically categorized by a subject matter and a user can browse sites by subject matter and/or perform a keyword search limited to a subject matter.

(b) White pages. The owners of web sites are listed in a geographical and/or alphabetical ordering. A user can browse web sites by owner name.

(c) Search engines. A user can perform a keyword search based on the content of WWW pages.

(d) Intelligent agents. A user defines a search criterion to an automated agent, which agent then searches for the information using search engines and/or web-crawling and/or alerts the user when new information comes to light.

(e) Indexes. Various services maintain indexes of interesting information and locations where such information may be found. In a WWW site of a particular company it is possible to determine a nearest outlet.

(f) Registry searches. A few new index services provide the possibility for a company or an individual to register an association between a slogan, trademark, product, subject and/or acronym and a WWW address and/or other company information. When a user enters such a keyword, the relevant information and/or addresses may be presented.

The Internet, in general, is an anonymous network and a particular search engine has no direct way of identifying a particular user. A mechanism called "cookies" is used by some WWW servers to store, at a user's computer, personalized information that is useful for accessing that site. Such information typically includes a preferred page layout and usage information, such as when the page was last accessed. In addition, such information may be used for targeting advertisements and/or for storing user preferences and/or previously entered data.

PCT publication 97/41673, the disclosure of which is incorporated herein by reference, describes a method of generating a psychographic profile of Internet users. It is suggested that the resulting profile be used, inter alia, for targeting of advertisements.

SUMMARY OF THE INVENTION

One object of some preferred embodiments of the invention is to provide a method of aiding information search and retrieval on an Internet. In a preferred embodiment of the invention, Internet searching is personalized to a particular user's profile. Alternatively or additionally, matching up of a supplier and a buyer, of a goods and/or a service, is facilitated, based on such personalization.

Another object of some preferred embodiments of the invention is to provide a "person" on an Internet with a persona and/or a mood, which affects the way the person interacts with other electronic entities on the Internet. In a preferred embodiment of the invention, the true identity of the person may remain anonymous.

One aspect of some preferred embodiments of the invention relates to generating an electronic person having a personality profile. The person preferably defines a personality for the Internet to interact with and/or be personalized to. Since the personality does not exist in a non-electronic form, it may be termed a "virtual personality". In a preferred embodiment of the invention, a user may switch between several personalities. In a preferred embodiment of the invention, a personality includes one or more of demographic information, geographic location, marketing information, subjects of interest to the user and/or other information, such as entertainment habits and ownership of a car. Each of the above subjects may include many sub-elements, for example, subjects of interest may include chess, checkers, baseball and swimming. Marketing information may include price preferences and buying habits. Geographical location may include one or more home locations, one or more shopping locations, one or more work locations and/or one or more vacation locations. In a preferred embodiment of the invention, the elements are hierarchically defined. In one example, a geographical location may include one or more of a country, city, neighborhood, street and house number levels. In another example, the area of interest "basketball" divides into a plurality of subject teams, and each team may be further subdivided into a plurality of players of interest. In a preferred embodiment of the invention, the elements include a relative weighting.

Another aspect of some preferred embodiments of the invention relates to providing such electronic persona with "moods", which define an instantaneous configuration of preferences and/or outlook. Typically, the mood modifies a persona. However, a mood may also operate without a persona. In one example, a particular persona may include a preference for difficult language. However, the persona's mood may be an "easy-going" mood, in which cases WWW sites having a simpler sentence structure and more graphics will be preferred. In another example, a mood may change between a "rush" mood, in which a user does not want to download large images and a leisure mood, where a user is willing to wait for long downloaded ad is willing to view advertisements if this makes his WWW access cheaper.

It should be appreciated that, technically speaking, both a mood and a persona may have a similar structure: preferences, weights and other aspects as described below. However, in a preferred embodiment of the invention, a persona is used to define a steady state personality which varies slowly, if at all. A mood is preferably used to emulate an instantaneous condition. In a preferred embodiment of the invention, the persona is defined as a structure and the mood defines changes in the structure, especially functional changes. For example, a "meticulous" persona which always desires complete downloads of images, may be modified by a "rush" mood, so that instantaneously it does not require complete downloads.

Another aspect of some preferred embodiments of the invention relates to using "persona" and/or "mood" (hereafter referred to together as "personality") to define a view of an Internet. In a preferred embodiment of the invention, one or more aspects of browsing and/or using the Internet may be affected by personality. In a preferred embodiment of the invention, the personality affects which data is displayed by the Internet. One aspect of this interaction, developed below, relates to an ability of automatically updating a mood based on actions of a user on the Internet. Thus, actions of a user affect can a style in which an Internet responds. In one example, a harried access to the Internet (not waiting for images to download, short dwell times) will result in the identification/definition of a rushed mood. Thereafter, search engines may steer the user away from sites which require long download times.

In one example, a search mechanism, such as yellow pages, white pages, indexes, search engines, intelligent agents and/or registry search, may filter and/or sort search results responsive to personality. In one example, a search may be limited to sites having a minimum percentage of graphics. In another example, a search result may be ordered by their average word length. Alternatively or additionally, the level of detail of the search results may be dependent on the mood, for example, in a rushed mood, only a line will be displayed for each search result. It should be appreciated that a persona is an indirect method of defining search criteria, as opposed to a usual method of defining search criteria, which precisely defines what type of information is desired in a site.

In a preferred embodiment of the invention, the browser itself, which servers as an interface to the Internet may also modify its functionality, responsive to the mood. Such modification may include one or more of menu length, help detail level, dialog boxes format, and response time vs. image quality.

It should be appreciated that a personality preferably includes both a persona and a mood. However, a personality may include only one of a personality and a mood. In one example, a personality may include only static preferences. In another example, a personality may include no static preferences but only dynamic mood parameters, such as being rushed or at leisure.

In a preferred embodiment of the invention, a personality defines the interpretation of key words and/or search terms. In one example, the word "U2" is interpreted as an aircraft designation for a "aeronautic" persona and as a name of a rock group for a "musical" persona. Another example is the word "chair" which can mean an academic position or an article of furniture. In one preferred embodiment of the invention, a single search may be applied to a plurality of different persona, yielding several sets of search results.

Additionally or alternatively, the personality may be used when entering any WWW site to provide personally tailored service. In one example, a news site will provide happy news for an "up-beat" persona and depressing news to a "pessimistic" persona. In another example, when entering a book-store or a library site, the site can tailor searches performed to the personality, for example, the regular interests of the user. In another example, a business mood will be greeted mainly with business news (and business related advertisements).

Another aspect of some preferred embodiments of the invention relates to personalizing advertisements responsive to a mood and/or a persona. This personalization of advertisements may be in addition to or alternatively to personalization responsive to a particular search and/or other actions performed by a user at a site. In a preferred embodiment of the invention, a site obtains information on a persona and/or a mood of the accessing user and then tailors services and/or advertisements based on the mood or persona. In a preferred embodiment of the invention, when a user enters a book-seller's web site, even if the user has never been at the bookseller, he may be offered books which match his persona and/or mood. It should be appreciated that, in some preferred embodiments of the invention, such a personality is not generally created and/or maintained by the site which uses the information for personalization.

In a preferred embodiment of the invention, a personality is stored as one or more cookies on a user's computer. Additionally or alternatively, the personalization information may be stored by a persona-service. Preferably, a user enters some type of identification, such as a code number, so that the service identifies the user. In some preferred embodiments of the invention, the persona are stored at a central location. Additionally or alternatively, the persona are stored in a distributed manner, such as locally to the users which use the persona. In a preferred embodiment of the invention, the personality and/or portions thereof may be stored as scripts to be executed and/or as parameters for pre-defined functions.

In a preferred embodiment of the invention, a persona is embodied by a program running on a user's computer, which program communicates with remote sites. The personalization information may be stored locally or may be acquired from a remote location, such as a persona server. Additionally or alternatively, the persona may be embodied by a proxy server, through which the Internet communication of a user must pass. In one example, a user access the Internet through a name server which translates nicknames, freeform text and/or search terms into URLs. The name server preferably also exhibits the user's personality to any site which requires it. Additionally or alternatively, a user's computer may include only an identification, such as in the form of a cookie. When a site requires personalization information, that information is downloaded from a persona server, using the identification cookie.

In a preferred embodiment of the invention, a persona and/or an identification of the persona is stored on a removable media, such as a diskette. Additionally or alternatively, it may be stored on a smart-card. Additionally or alternatively, it may be stored as a printed bar-code or bar codes. In a preferred embodiment of the invention, a persona may be used outside the Internet, for example in automated stores, for customizing the selection and/or offerings to such a customer.

In a preferred embodiment of the invention, charges are made for one or more of using, updating, accessing and/or exhibiting personalities. In some cases, the user may be charged. Additionally or alternatively, site owners and/or advertisers using the information are charged. Additionally or alternatively, the user may agree to allow himself to be targeted by advertisements and/or other types of promotions based on his profile instead of or in addition to being charged. In a preferred embodiment of the invention, the charges may depend on the personality. For example, in a rushed mood, a user will not desire to see advertisements. In a preferred embodiment of the invention, a user can ransom advertisements by paying a certain charge for not being presented with them. Preferably, the charges are consolidated in a monthly bill.

Another aspect of some preferred embodiments of the invention relates to security. In many cases a user will want to use his persona to affect his view of the Internet but will not desire such information to be freely available. In a preferred embodiment of the invention, only portions of a persona and/or a mood are provided to each site. In a preferred embodiment of the invention, the information provided is limited so that a particular user cannot be identified. In one example, geographical location and telephone number are not provided together. Additionally or alternatively, at least some of the personalization information is utilized as in a "black box." When a site desires to personalize information and/or functionality, the site queries the persona server and the persona server responds for a particular situation. In one example, a search engine will transmit, to a persona server, a list of search results with their grading. The persona server may then respond with an order which is preferred by the requesting user. Preferably, the search site will not be provided with any identifying information about the user, except for an identification number randomly generated by the persona service for the particular search session.

Additionally or alternatively, personalization information may have a limited availability, for example, being provided only to registered and/or otherwise certified sites. Alternatively or additionally, a user may be queried to approve a particular site and/or a particular request. In a preferred embodiment of the invention, a user must enter a password to approve such a request. In one preferred embodiment of the invention, such a request is embodied as a WWW page sent by the persona server. Alternatively or additionally, the request is embodied as a pop-up window of the browser.

Another aspect of some preferred embodiments of the invention, relates to updating a mood and/or a persona. In a preferred embodiment of the invention, a user may manually modify a mood and/or a persona. Preferably, a mood and/or a persona is modified by changing parameters of the personality. Additionally or alternatively, a personality may be modified by selecting parameters and/or values for the parameters from existing definitions libraries. Optionally, such a selection may be modified by a user. Additionally or alternatively, a user may upload new personas and/or moods to a persona server, for personal use and/or for use by other users. Such personalization information, including libraries, moods, personas and/or portions thereof may also be transmitted by e-mail to other users and/or to other locations.

Additionally or alternatively, personality may be updated automatically. In a preferred embodiment of the invention, the mood is updated based on the one or more of the identification of sites visited by a user, the number of site visited, the dwell time at each site, the order in which sites are visited, the contents of the sites, services purchased, information downloaded, actions performed at the sites and/or a predefined or adaptive time-line based function. Alternatively or additionally, a mood, for example a "rush" mood, may be identified by tracking whether a user waits until images are downloaded, whether a user waits for a complete site to download, whether a user follows links and how many links are followed, and/or rate of changing WWW pages and/or sites. These tracked variables may be compared to a standard. Alternatively or additionally, the tracked variables may be compared to a previously acquired baseline of a user. Thus, relative changes in dwell time are tracked.

In a preferred embodiment of the invention, a mood update also takes into account whether a WWW site is actually being viewed. In one example, the site may be downloaded by an invisible browser window. In another example, a user may be away from a computer (which may be determined if there are no user inputs and/or a screen-saver is activated).

The automatic updating may be performed at the user site, for example by tracking the activity of an Internet browser. Such tracking is preferably achieved using a standalone program which monitors the browser and/or TCP/IP connections. Alternatively or additionally, a dedicated TCP/IP stack and/or driver is used. Additionally or alternatively, the updating may be performed by a server, such as a proxy server, through which a significant portion of a user's requests and/or traffic, pass. In a preferred embodiment of the invention, such logging and/or tracking and/or persona modification require a user's explicit permission.

In a preferred embodiment of the invention, a user may require that certain WWW sites not be tracked, for example, sex related sites and Gambling related sites.

It should be appreciated that a mood is generally updated more often than a persona. In a preferred embodiment of the invention, a mood and/or a persona may be updated by modifying continuous parameters. Additionally or alternatively, such updating may include modifying discrete parameters. An example of a continuos parameters is "wait time" which indicates how long a user is willing to wait for a site to be downloaded. An example of a discrete parameter is a level of Parental Guidance rating of sites (PG-13, R, X). In a preferred embodiment of the invention, a plurality of personalities are predefined. Modifying a persona and/or a mood may include switching between such predefined personalities.

Another aspect of some preferred embodiments of the invention relates to interpretation of site functionality, responsive to a particular personality. In one example, a button marked "flowers" comprises a link to a site for ordering flowers. Responsive to the persona's geographical location and/or price preferences, connection to a different site may be made when the button is pressed, depending on the personality. Another example is a button marked "music", which downloads music to match the particular mood. Examples of moods to which music may be matched include: upbeat, rushed, loud, muted, and/or to mach color schemes.

Another aspect of some preferred embodiments of the invention relates to the way in which a persona may be defined. In one preferred embodiment of the invention, a persona is defined as a set of parameters with values associated with each parameter. Additionally or alternatively, the parameters may be organized, for example by subject and/or in a hierarchical manner. In a preferred embodiment of the invention, the persona is organized in an object oriented manner. In a preferred embodiment of the invention, not all persona have the same parameters. In a preferred embodiment of the invention, two types of parameters are used, local and global. Local parameters affect only a small part of the interaction with the Internet. For example "subject of interest=baseball" does not affect browsing of business sites, except perhaps advertisements. However, "image download tolerance time=3 sec" affects the browsing of any site having images. Also "Color scheme=garish" will affect the search results of diverse searches. In contrast to such site-general parameters, a persona may also include site specific parameters, for example, "CNN subscriber number=123456", which affect substantially only interaction with the CNN web site.

In a preferred embodiment of the invention, parameters may include information, such as "subject of interest=chess". A parameter may also be negative, for example, a blacklisting: "reject=pornography" or "reject if pornography level >3". Additionally or alternatively, a persona may include weighing information, such as relative preference of subjects of interest, for example "baseball=5, basketball=3". Additionally or alternatively, a persona may include functional information, such as how to evaluate a particular parameter, the affect of a parameter and/or evaluate a grade for a particular site, in view of a parameter. Additionally or alternatively, a parameter may be reflexive towards the persona, for example defining how to modify the persona and/or a mood based on user activities. Additionally or alternatively, a parameter may define the traits which should be evaluated when determining a suitability of a site to a persona.

Additionally or alternatively, a parameter may define what type of site atmosphere (i.e., an ambiance) and/or other traits are suitable for different moods and/or based on values of other parameters. In one example, a first happy persona will desire happy sites, while a second happy persona will desire bland sites, but good news. In another example, when a personality becomes happier the sites provided should be more morbid, thereby counteracting changes, while for another persona, the types of site provided should reinforce the changes in persona or mood.

Additionally or alternatively, to defining a persona using parameters, a persona may be defined by scripts. Preferably, such scripts are activated as result of events, such as "user entered a search request", "does attached site match the present mood" or "site asking for personalization information". Additionally or alternatively, a persona may be defined as a single program that accepts inputs and generates outputs. Additionally or alternatively, a persona may be defined by pre-selecting certain behaviors and setting parameter values for each selected behavior.

In a preferred embodiment of the invention, a group of personalities may be defined for related users. In one example, friends or members of a club may desire to share a small set of personalities or moods. In another example, family members may share many attributes, including address and financial situation.

In a preferred embodiment of the invention, a mood or a persona may be provided by an outside entity. In one example, an advertise may provide a persona and/or mood tailored for a particular product or group of products. This type of persona could be configured to receive advertisement, promotions and/or search results geared towards the product. Typically, using such a mood may result in a rebate on purchases, Internet fees and/or may involve a promotion including the product, for example a free sample.

In a preferred embodiment of the invention, a mood is defined as parameters with values that affect a persona. Such values may be, inter alia, single values, ranges of allowed values, scripts, continuous values and/or discrete values. A mood may replace certain parameter values, affect their value and/or affect their relative weighting. In some preferred embodiments of the invention, a persona may be embodied as a filter program which generates relative weights for a list of sites, based on the persona parameters and/or values. In a preferred embodiment of the invention, a mood may define filters to apply before the input and/or after the output of a persona.

Additionally or alternatively, a mood may define parameters that affect the execution of a persona's behavior. Additionally or alternatively, a mood may include segments of a persona to add to an existing persona. In a preferred embodiment of the invention, a single mood may be defined to fit more than one persona. Preferably, the different types of persona are grouped and/or hierarchically organized and each mood has a scope of personas it may affect.

Another aspect of some preferred embodiments of the invention relates to evaluating an atmosphere and/or other traits of a site. In a preferred embodiment of the invention, depending on a persona, several characteristics of a site may be defined, which may be used in filtering out and/or prioritizing such a site. Alternatively or additionally, such information may be used database of sites with their associated values is maintained, so that such characteristics do not need to be re-evaluated very often.

Another aspect of some preferred embodiments of the invention relates to associating traits and/or an atmosphere with a WWW site. The associations may be stored at a central location. Additionally or alternatively, the associations and/or trait-related keywords and/or values may be associated with each site. Additionally or alternatively, a site may include an identification number, which when used with a proper trait server, provides information about the sites traits and/or a match and/or grade with a particular personality. Additionally or alternatively, such associations may be stored in search indexes, preferably in a manner similar to the storage of key words.

In a preferred embodiment of the invention, a trait server provides the trait information for a fee. Additionally or alternatively, the information is provided in return for an agreement by the requester to be targeted for at least a limited number of advertisements and/or other promotions. Alternatively or additionally, the service may be provided for free There is therefore provided in accordance with a preferred embodiment of the invention, a method of a user interacting with an Internet, comprising:

tracking interactions of the user with an Internet;

analyzing said tracked interactions to determine at least one aspect of a user's interaction with the Internet; and modifying future interactions of said user with said Internet, responsive to said determined aspect, wherein said modified interactions comprise site-content related interactions with a plurality of unrelated sites.

Preferably, said tracking comprises tracking at a computer at which said user accesses the Internet. Alternatively or additionally, said tracking comprises tracking at a tracking computer which tracks a plurality of users. Preferably, said tracking computer is physically remote from said plurality of sites.

In a preferred embodiment of the invention, said analyzing comprises analyzing previously acquired tracking data. Alternatively or additionally, said analyzing comprises analyzing of currently acquired tracking data. Alternatively or additionally, said determined aspect is modeled using a virtual personality, which is a complex of characteristics that distinguishes an electronic person, for the purpose of interacting with an Internet. Preferably, said virtual personality comprises a persona, which is a static aspect of a personality. Alternatively or additionally, said virtual personality comprises a mood, which is a dynamic aspect of a personality. Preferably, said mood comprises a rush mood, which favors fast responses. Alternatively or additionally, said persona comprises a meticulous persona, which favors complete responses.

In a preferred embodiment of the invention, said personality comprises geographical information. Alternatively or additionally, said personality comprises demographic information. Alternatively or additionally, said personality comprises interests and preference information. Alternatively or additionally, said personality comprises marketing information. Alternatively or additionally, said personality comprises identification and contact information. Alternatively or additionally, said personality comprises relational information, which defines relations between various aspects of the personality. Alternatively or additionally, said personality comprises reflective information, which defines how a personality changes and/or interacts with other electronic entities. Alternatively or additionally, said user selects a particular virtual personality from a plurality of personalities to which to attribute said tracked interactions.

In a preferred embodiment of the invention, said future interactions comprise searching. Alternatively or additionally, said future interactions comprise viewing presented data. Preferably, modifying said interactions comprises changing a layout of data. Alternatively, modifying said interactions comprises changing which data is displayed.

In a preferred embodiment of the invention, said future interactions comprise downloading files. Alternatively or additionally, said future interactions comprise WW navigation.

There is also provided in accordance with a preferred embodiment of the invention, a method of user virtual personality maintenance, comprising:

interacting with an Internet via a virtual personality, which is a complex of characteristics that distinguishes an electronic person, for the purpose of interacting with an Internet;

tracking at least one user activity of interaction with an Internet; and modifying said virtual personality responsive to said user activity, wherein said virtual personality is user-selected for interaction with a plurality of different sites.

Preferably, modifying comprises modifying a mood of said virtual personality, wherein a mood is a dynamic aspect of a personality. Alternatively or additionally, the method comprises a user selecting said virtual personality to be modified.

There is also provided in accordance with a preferred embodiment of the invention, a method of user virtual personality maintenance, comprising:

providing first virtual personality, which is a complex of characteristics that distinguishes an electronic person, for the purpose of interacting with an Internet;

copying at least a part of said first virtual personality into a second virtual personality; and selecting said second virtual personality, by a user, to interact with an Internet.

Preferably, the method comprises further modifying said second virtual personality. Alternatively or additionally, providing said first virtual personality comprises:

providing a library of virtual personalities; and selecting said first virtual personality from said library.

There is also provided in accordance with a preferred embodiment of the invention, a method of virtual personality interaction with an Internet, comprising:

providing a virtual personality, which is a complex of characteristics that distinguishes an electronic person, for the purpose of interacting with an Internet, through which virtual personality an interaction with an Internet is meditated;

identifying at least one prospective site for the interaction;

automatically analyzing a content of said site to determine a match to said virtual personality; and performing said interaction responsive to said analysis. Preferably, analyzing a content, comprises determining at least one trait of said site. Alternatively or additionally, analyzing a content comprises determining an ambiance of said site. Alternatively or additionally, analyzing comprises analyzing lexicographical characteristics of said site. Alternatively or additionally, analyzing comprises analyzing graphical characteristics of said site. Alternatively or additionally, identifying at least one site comprises identifying a plurality of sites. Preferably, identifying comprises searching using an Internet search engine.

In a preferred embodiment of the invention, said virtual personality comprises a mood, which is a dynamic aspect of a personality. Alternatively or additionally, said virtual personality comprises a persona, which is a static aspect of a personality. Alternatively or additionally, said interaction is performed to complement said virtual personality. Alternatively, said interaction is performed to match said virtual personality.

There is also provided in accordance with a preferred embodiment of the invention, a method of Internet interaction by a single user, comprising:

selecting, from a remote location, by the user, one of a plurality of virtual personalities available for interaction with a particular site, wherein a virtual personality comprises a complex of characteristics that distinguishes an electronic person, for the purpose of interacting with an Internet; and interacting with the particular site using the selected virtual personality.

There is also provided in accordance with a preferred embodiment of the invention, a method of site ambiance provision, comprising:

receiving an identification of a site; and providing an indication of an ambiance of said site, responsive to said identification.

Preferably, providing comprises retrieving said indication of an ambiance from a memory. Alternatively or additionally, providing comprises analyzing said site. Alternatively or additionally, providing comprises requesting an indication of said ambiance from said site. Alternatively or additionally, providing comprises requesting an indication of said ambiance from an ambiance server.

There is also provided in accordance with a preferred embodiment of the invention, a virtual personality server, comprising:

a connection to a user, through which said user indicates a desired Internet interaction;

a virtual personality adapter, which adapts said interaction utilizing a virtual personality for the user, wherein a virtual personality comprises a complex of characteristics that distinguishes an electronic person, for the purpose of interacting with an Internet; and a connection to a WWW site, through which said virtual personality adapter interacts said modified interaction with said site.

Preferably, said connection to a user is operable to receive a selection of a particular virtual personality by said user. Alternatively or additionally, said server modifies said virtual personality responsive to said modified interaction. Alternatively or additionally, said virtual personality comprises a persona. Alternatively or additionally, said virtual personality comprises a mood.

There is also provided in accordance with a preferred embodiment of the invention, a method of virtual personality serving, comprises:

connecting to a WWW site, to request an interaction;

determining, at said WWW site, a desired virtual personality adaptation of said interaction, wherein a virtual personality comprises a complex of characteristics that distinguishes an electronic person, for the purpose of interacting with an Internet;

completing said interaction, by said WWW site, responsive to said determined virtual personality adaptation.

Preferably, determining comprises receiving an indication of a desired virtual personality from a virtual personality server. Preferably, said virtual personality server is located at a location remote from said WWW site and from a location at which said connection is initiated. Alternatively, said virtual personality server is located at a location from which said connection is initiated.

In a preferred embodiment of the invention, determining comprises reading virtual personality information from a computer at a location from which said connection is initiated.

In a preferred embodiment of the invention, said virtual personality server generates a one-time virtual personality for said interaction.

In a preferred embodiment of the invention, said desired virtual personality adaptation comprises a mood-responsive adaptation, wherein a mood is a dynamic aspect of a personality. Alternatively or additionally, said desired virtual personality adaptation comprises a persona-responsive adaptation, wherein a persona is a static aspect of a personality.

There is also provided in accordance with a preferred embodiment of the invention, a method of site matching to a virtual personality, comprising:

providing a list of relevant sites;

analyzing each of said sites to determine a match with said virtual personality, which is a complex of characteristics that distinguishes an electronic person, for the purpose of interacting with an Internet; and grading said sites responsive to said analysis.

Preferably, providing a list comprises executing a search on an Internet search engine to provide said list. Alternatively or additionally, providing a list comprises retrieving a plurality of matches from a name server. Alternatively or additionally, analyzing comprises analyzing at least one of said sites responsive to a presented ambiance. Alternatively or additionally, analyzing comprises analyzing at least one of said sites responsive to a presented trait. Alternatively or additionally, analyzing comprises analyzing a content of at least one of said sites. Alternatively or additionally, the method comprises displaying said graded list. Alternatively or additionally, the methdo comprises displaying only a highest graded site of said list.

There is also provided in accordance with a preferred embodiment of the invention, a method of advertisement personalization, comprising:

determining a present virtual personality of a human interactor, wherein a virtual personality comprises a complex of characteristics that distinguishes an electronic person, for the purpose of interacting with an Internet;

selecting at least one advertisement to match said virtual personality; and presenting said advertisement to said interactor.

Preferably, said advertisement is presented through an Internet. Alternatively or additionally, said virtual personality comprises a persona, which is a static aspect of a personality. Alternatively or additionally, said virtual personality comprises a mood, which is a dynamic aspect of a personality. Alternatively or additionally, said virtual personality is selected and provided by said interactor.

There is also provided in accordance with a preferred embodiment of the invention, a method of WWW site modification, comprising:

detecting at the WWW a desired interaction from a particular virtual personality, which personality comprises a complex of characteristics that distinguishes an electronic person, for the purpose of interacting with an Internet;

modifying at least one characteristic of said site to match said virtual personality; and responding to said desired interaction with a response indicating a match of said modified characteristic to said virtual personality.

Preferably, said modification comprises modifying a display layout. Alternatively or additionally, said modification comprises modifying a level of detail shown. Alternatively or additionally, said modification comprises selecting data to be displayed.

There is also provided in accordance with a preferred embodiment of the invention, a method of data directory display, comprising:

requesting a display of data from a data directory;

providing, in association with said request, a virtual personality for said request, which personality comprises a complex of characteristics that distinguishes an electronic person, for the purpose of interacting with an Internet; and displaying said data, responsive to said virtual personality.

Preferably, said virtual personality is provided as part of said request. Alternatively or additionally, said displaying comprises filtering. Alternatively or additionally, said displaying comprises sorting. Alternatively or additionally, said displaying comprises controlling a level of detail. Alternatively or additionally, said displaying comprises controlling a spatial layout of said data.

There is also provided in accordance with a preferred embodiment of the invention, a method of data directory display, comprising:

requesting a search from a search engine, using at least one keyword, which request includes a virtual personality for said request, which personality comprises a complex of characteristics that distinguishes an electronic person, for the purpose of interacting with an Internet;

interpreting said key-word at said search engine, utilizing said virtual personality; and performing said search request by said search engine, utilizing said interpreted key-word.

Preferably, said search engine comprises an Internet search engine.

There is also provided in accordance with a preferred embodiment of the invention, a method of Internet search, comprising:

connecting to an Internet search engine;

providing the search engine with search criteria;

performing a search for WWW sites by the search engine, utilizing said search criteria, to obtain search results; and filtering said search results utilizing personal information.

Preferably, said filtering is performed at a different computer from said searching. Alternatively or additionally, said personal information is provided using a virtual personality, which comprises a complex of characteristics that distinguishes an electronic person, for the purpose of interacting with an Internet.

Preferably, said personal information is provided as a non-keyword input to said search engine.

There is also provided in accordance with a preferred embodiment of the invention, a method of interacting with a computer:

providing a software application having a user interface on said computer;

providing an electronic representation of at least part of a user's desired personality; and said software modifying its interaction with said user, responsive to said representation of said personality.

Preferably, said software comprises an Internet Browser. Alternatively or additionally, said software modifies a visual display of said interface. Alternatively or additionally, said software modifies a behavior of said interface. Alternatively or additionally, said software modifies a menu length of said interface. Alternatively or additionally, said software modifies a help level of said software. Alternatively or additionally, said software modifies a level of detail presented by said software. Alternatively or additionally, said software modifies a display format of said software. Alternatively or additionally, said software modifies an image quality of said software. Alternatively or additionally, said software modifies a response time of said software. Alternatively or additionally, said representation is generated by tracking a plurality of interactions of said user with an Internet. Alternatively or additionally, said representation comprises a representation of a persona, which is a static aspect of a personality. Alternatively or additionally, said representation comprises a representation of a mood, which is a dynamic aspect of a personality. Alternatively or additionally, said desired personality comprises a true personality of said user. Alternatively or additionally, said desired personality comprises a true personality of said user.

There is also provided in accordance with a preferred embodiment of the invention, a method of utilizing an electronic representation of a user's desired personality, comprising:

storing said representation on a computer-readable storage media; and interacting with a computer using said representation, wherein said representation mediates the interaction.

Preferably, said computer comprises a remote computer connected to an Internet. Alternatively or additionally, said computer comprises a controller of an automated store. Alternatively or additionally, said mediation comprises varying a range of offered selection of products. Alternatively or additionally, said media comprises a diskette. Alternatively or additionally, said media comprises a smart card. Alternatively or additionally, said media comprises printed optically readable codes.

BRIEF DESCRIPTION OF THE DRAWINGS

The invention will be more clearly understood by reference to the following description of preferred embodiments thereof in conjunction with the figures, wherein identical structures, elements or parts which appear in more than one figure are labeled with the same numeral in all the figures in which they appear, in which.

DETAILED DESCRIPTION OF PREFERRED EMBODIMENTS

Figure 1:
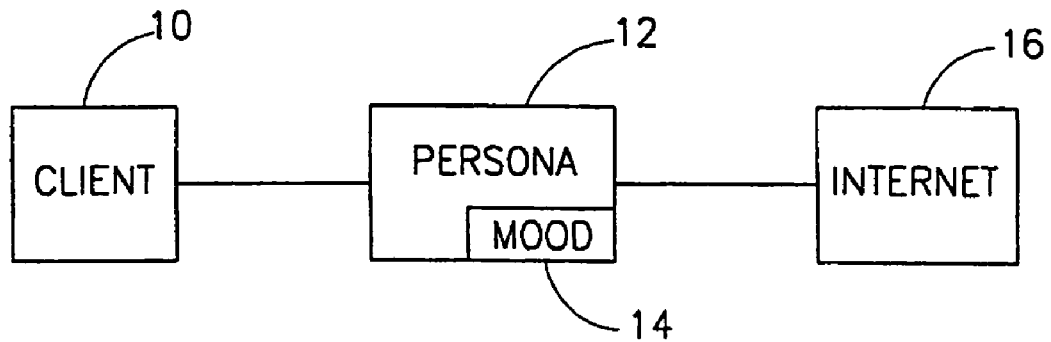
FIG. 1 schematically illustrates the use of a persona while browsing an Internet, in accordance with a preferred embodiment of the invention.

FIG. 1 schematically illustrates the use of a persona 12 while browsing an Internet 16, in accordance with a preferred embodiment of the invention. A client 10 views Internet 16 through a persona 12. Persona 12 may be further modified by a mood 14. In a preferred embodiment of the invention, a persona and/or a mood (hereafter "personality") can be used to filer information on Internet 16, thereby making the amount information more manageable and better suited for client 10. It should be appreciated that in many cases there are several possible correct responses to a client's need. However, one of these responses may better suit the frame of mind of the client. In a preferred embodiment of the invention, a persona and/or a mood may be used to have one or more of the following effects on the interaction between client 10 and Internet 16:

(a) preferentially guide client 10 to certain sites;

(b) affect the way searches are performed for information and/or web sites;

(c) affect the way a particular web site responds to a client's request;

(d) affect the display of information;

(e) affect the format and/or layout of a site on the client's terminal;

(f) affect the interpretation of a client's actions and/or data entry;

(g) target promotions and/or advertisements to a client; and/or (h) protect a client from unwanted influences on Internet 16.

In a preferred embodiment of the invention, a client may have a plurality of personalities and manually select a particular persona for a session or a portion of a session. Thus, client 10 might start the day with a "rushed" personality and in the afternoon switch to a "leisurely" persona.

In a preferred embodiment of the invention, a persona includes one or more of the following types of information:

(a) Demographic information, possibly including one or more of: age, sex, religious affiliation, culture subgroup, socioeconomic status, martial state, educational state, number of telephones at home, distance from post office, family members information and/or pets. Alternatively or additionally, also personal information, such as birthdays and wedding anniversaries are included. In a preferred embodiment of the invention, an advertiser matches a promotion to the special date, for example, a gift on a birthday, suitable for the persona's professed interests (see "c" below).

(b) Geographical information, possibly including one or more of, home location(s), work location(s), shopping location(s), vacation location(s) and/or other user defined locations and/or areas. In some cases more than one geographical location may be defined, for example, for a person having two homes or where two shopping districts are applicable.

(c) Interests and preference information, possibly including one or more of hobbies (chess, sports, painting), academic interests, taste in music, taste in movies, preferred fashion designers, political views, membership in voluntary groups and/or fraternities, membership in a persona group, favorite color, set of beliefs, personality type, outlook (optimistic, pessimistic, believer in human nature being good), sexual preferences, density of information preferred, number of advertisements preferred, requirement for a seal of approval, requirement for a site review, requirement for a site being accessed often, number of links, download time, preference for sites that give out presents and/or other promotional merchandise. Alternatively or additionally, IDs of friends may be included. Preferably, the personality of a user may be estimated based on the types of friends him keeps in contact with. In a preferred embodiment of the invention, the persona server tracks frequency, length and/or content of electronic communications with the friends, for example by e-mail, by chat group, by Internet telephone or by computer-dialer, to evaluate an instantaneous mood and/or to assess the relative effect of these friends. Alternatively or additionally, the persona server may create a representation of the connection between friends, based for example on the electronic communication between them and/or on inputted connections. Using such a representation, a WWW site may simultaneously provide an offer to a group of friends, for example a jeep tour. Alternatively or additionally, an advertiser may user the information to identify trend setters. In some types of advertising campaigns such trend setters are targeted first.

(d) Marketing information, possibly including one or more of: credit rating, preferred price range, purchasing style (conservative or adventurous), preferred purchasing method, price point for various products, purchasing history, maintenance level desired for a product, willingness to pay for the use of a service, willingness to be identified, willingness to fill in forms type of preferred advertisements, preference for national chains vs. local chains, preference for large number of nearby stores vs. small number of nearby stores, belonging to a consumer's group and/or profile of advertisements previously viewed and/or judged by the client. Marketing information may depend on a type of product, for example, a particular persona may prefer cheap cars and expensive alcohol. Alternatively or additionally, more complex relationships may be defined. For example, a persona may agree to consider Swiss chocolate only if it costs less than $10/lb. or if it contains at least 33% chocolate solids.

(e) Identification and contact information, possibly including one or more of: mail address, WWW home page(s), e-mail address and/or financial information, such as bank account and/or credit card information.

(f) Relational information, which defines relations between various aspects of the persona, including, relative weights, interaction between parameters (something that is both chess and baseball may be 10 times as interesting if it matches only one of the subjects), dependencies (a client can prefer complex language in chess-related information but simple language in baseball-related information).

(g) Reflective information, which defines how a persona changes and/or interacts with other electronic entities, including, effect of mood on grading of sites, matching functions for evaluating sites and/or matching an information file to one or more parameters, default mood, and/or effect of browsing and/or user input and/or downloaded information on personality. In addition, reflective information may define limitations on allowed ranges, for example relative weights. As described below, a persona may change over time. These ranges may limit the allowed changes in a persona. Additionally or alternatively, a reflective information may define an activity to perform when a certain mood is reached, for example, if a mood becomes too happy, the persona may be adjusted to cause the mood to become less happy.

(h) Miscellaneous information. Any information may be associated with a persona. In one example, a persona may include examples of preferred sites.

The above described information about a persona may be stored in one or more of many ways, in accordance with preferred embodiments of the invention. In a preferred embodiment of the invention, the information is implicit in a program and/or a set of programs of scripts which carry-out the persona. Additionally or alternatively, the information is stored as parameters for predefined and/or user defined functions. Additionally or alternatively, parameter values comprise scripts or functions which generate values, responsive to input values, internal variables, global variables, other parameters of the persona and/or the parameters of the mood. Additionally or alternatively, the information is stored as values for preset persona parameters.

In a preferred embodiment of the invention, a mood may include any of the above pieces of information. The mood information may then be used to augment and/or to replace portions of the persona. In a preferred embodiment of the invention, the persona is defined as a structure and the mood defines changes in the structure, especially functional changes. For example, a persona may define subjects of interests and a mood defines relative weighting between the subjects.

In a preferred embodiment of the invention, the mood may be used to modify the identification information. In one example, play moods receive e-mail in which the subject line is prefixed with the phrase "mood=play", while work moods may be prefixed with the phrase "mood=work". Thus, a user can differentiate between the results of his various moods, using existing software. Alternatively or additionally, software, such as browser software may be adapted to present the results of the separate moods independently or comparatively.

In a preferred embodiment of the invention, a mood may be utilized to search for suitable personal contacts, for example in a chat group or in a dating system. It should be appreciated that matches, if any, are made based on the instantaneous mood and not based on some general profile which is entered at a single point in time. Thus, at one time, a user may be matched up with a somber chat member while at another time a user may be matched up with an upbeat chat member.

In a preferred embodiment of the invention, a mood and/or persona may be used to aid in polling. Preferably, when creating a list of persons to poll, the pollster may take advantage of the listing of the persons preferences, demographic information, preferences and other information associated with a person. In a preferred embodiment of the invention, a poll may be made more statistical significant by selecting certain slices of society based on the persona information. Alternatively or additionally, an existing poll may be analyzed based on the persona information. Alternatively or additionally, a poll may be directed only at segments of society which would have a meaningful response. This is especially true of advertising polls, where only a potential market should be polled.

Figure 2:
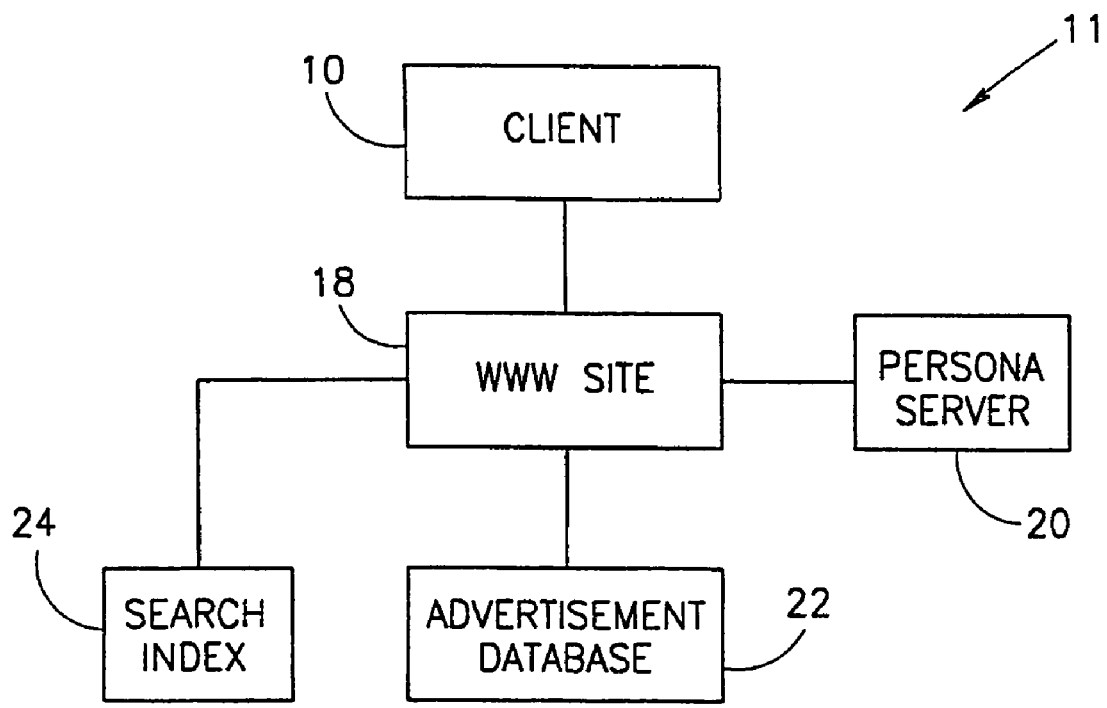
FIG. 2 illustrates a persona server configuration, in accordance with a preferred embodiment of the invention.

FIG. 2 illustrates a persona server configuration 11, in accordance with a preferred embodiment of the invention. A client 10 is connected to a WWW site 18. A persona server 20 provides persona information to site 18, to enable site 18 to personalize it's interaction with client 10. Persona server 20 itself may include a database having persona and/or mood details for a plurality of users and Internet connections, for connecting to sites and/or a client computer. A CPU in persona server may be used to evaluate personalities and/or suitability of sites.

Alternatively, other configurations may be used, in accordance with preferred embodiments of the invention. In one alternative configuration, a persona server is situated between a client and the Internet and may also control access to various parts of the Internet. This configuration may be implemented if the persona server is associated with an ISP, a proxy server and/or a name sever, for example as described in U.S. Pat. No. 5,764,906, issued Jun. 9, 1998 or Israel patent application number 123,129, filed Jan. 30, 1998, to Aviv Refuah, the disclosures of which are incorporated herein by reference. In another alternative configuration, a persona server may be installed on a client computer.

In a preferred embodiment of the invention, the persona information is stored on at a centralized location. Additionally or alternatively, the persona information is stored using a distributed configuration, in which it is partially stored in a centralized location and partially stored at a client's computer, preferably, using cookies. Alternatively or additionally, multiple copies of a single persona and/or mood may be stored at different locations. Alternatively or additionally, at least part of the persona and/or mood may be stored at sites, such as search sites, which use the personality information. Alternatively or additionally, the persona information is stored on a client's computer, preferably using cookies. In a preferred embodiment of the invention, at least an identification number is stored on a clients computer, so that persona information may be retrieved by the client's computer from a remote location using that identification number. In a preferred embodiment of the invention, a program running on a client's computer modifies the cookies to present a particular personality. Preferably, such a program stores the persona in a local database file.

In a preferred embodiment of the invention, the persona information is associated with the identification number using a database. Additionally or alternatively, a persona may be created ad-hoc, for use in a single WWW site access, a single search and/or for a short period of time.

In a preferred embodiment of the invention, a persona is statically stored at a first location and a mood is dynamically stored at a second location. In a preferred embodiment of the invention, a single persona may be shared between several users, with only the moods being different. The moods may also be selected from a table, such that what categorizes a particular personality is an instantaneous association of a predefined persona with one or more predefined moods.

In a preferred embodiment of the invention, a persona is used to personalize information retrieval. Such personalization can affect many methods of information retrieval, including search engines, name servers, intelligent agents, yellow pages, white pages, and searching inside a WWW site, such as searching for articles on Microsoft products inside the Microsoft WWW site. It should be noted in this context that search engines return matches for a particular query, while personality and mood are designed to affect the results of substantially any query, even though a personality does not specifically point out a desired piece of information.

The information retrieval may be filtered and/or sorted based on the persona. Additionally, the persona may decide how a particular search word is interpreted. Various combinations of thresholding, grading and sorting may be applied on search results, by comparing them to a persona. One or both of the following two techniques are preferably used to match a persona to a search result, namely key-words and evaluation. In the key-words technique, a search index includes a classification and/or key-words which match parameters such as those described above for a persona. For example, a site may be indexed as being related to a particular type of music, which type may match a preference of a client.

In the evaluation technique, a site is evaluated for suitability and/or for qualities which are preferred and/or match a particular persona. Example include: number of images in the site, expected download time and/or number of links from the site.

In a preferred embodiment of the invention, the presentation of search results may also be parameters of the persona. In one example, the persona can dictate whether or not to grade sites or information files and whether or not to limit the results using criteria such as geographical criteria. Thus, in one case, a strong match will be shown even if its associated geographical location is 1000 miles away. In the other case, only hits having an associated geographical location within 50 miles are shown. Additionally or alternatively, a mix between near and far results may be defined. One or more parameters of a persona may define matching requirements, for example exactness of match and allowed error. These parameters may depend on the preference being matched. In some cases, there is no way to match a parameter of a persona (e.g., if no geographical location is associated with the site). Default behavior in such cases may also be a parameter of the persona.

In one example, entering searching for a pizza store will generate a different web site connection, based on where the connection is from. For example, a user in Brighton, Mass. will be directed to a different pizza store from a user in downtown Boston, even if both stores belong to the same franchise.

Additionally or alternatively, a persona may define multiple response sets. In one example, one set includes low-cost book stores and a second set-includes high-cost book stores. This division may be the result of a preference for differentiating between high-cost and low-cost suppliers.

In a preferred embodiment of the invention, a far geographical location may be considered to have the effect of a near location, responsive to the availability of mail order and/or courier services. Preferably, such a translation is also a function of the transportation cost. This type of translation may also be governed by a parameter of a persona.

In a preferred embodiment of the invention, the personality is used as an input to an intelligent search agent. It should be appreciated that a persona is an indirect method of defining search criteria, as opposed to a usual method of defining criteria for an agent. Additionally or alternatively, the agent can dynamically modify his searching and/or presentation of results, responsive to changes in the personality.

When an interactive agent, such as an agent which performs negotiation is used, the persona may also be used to affect the agent's behavior. In one example, an agent is made more aggressive, as the persona's outlook becomes more optimistic. In a preferred embodiment of the invention, the interaction between the personality and the agent may also be defined as parameters of the persona. Some aspects of automated agents are described in PCT publication WO 97/26612, titled "Intelligent Agents for Electronic Commerce", filed Jan. 17, 1997 in the US Receiving office, the disclosure of which is incorporated herein by reference.

When white and/or yellow pages are used, the display of information from a database may be determined by the personality, for example, the display of listings of baby-sitters, handymen and car garages may all depend on a geographical distance.

In a preferred embodiment of the invention, the personality may be used to target advertisements to the client. Such targeting may also take into account previous advertisements viewed by the client. In one example, advertisements are matched to professed subjects of interest. Additionally or alternatively, advertisements are matched to an outlook, for example morbid or sunny. Alternatively or additionally, advertisements are selected from a set of suitable advertisements to match a persona. For example, if two soft drink advertisements are available, one which includes animals and one which includes cars, the "animal" advertisement will be selected for a persona which likes animals. Similarly, some advertisements are garish, while some are reasoned out. A somber mood will preferably be targeted with the reasoned out advertisement, since a garish advertisement might antagonize the client.

In a preferred embodiment of the invention, a WWW site may tailor its reactions to the client based on the persona. In one example, the content of links on a page may depend on the persona. Additionally or alternatively, the effect of a button may depend on the persona, for example a persona's geographical location. Additionally or alternatively, a Java applet and/or a JavaScript script may utilize persona information in their execution. For example, prior to rendering a button, a Java applet may check if to use a garish background for an upbeat persona or a muted background for a somber persona.

In a preferred embodiment of the invention, persona information is used to exercise parental control over a child's browsing. In such a case the persona is "hardwired" or protected from changes to reject undesirable sites.

In a preferred embodiment of the invention, the persona is generated and/or maintained by a client. Additionally or alternatively, the persona may be generated by a gateway through which a client accesses the Internet. In some cases, the persona may be generated on a client's computer, in a manner which is transparent to the client. In a preferred embodiment of the invention, a client can define certain sites and/or site types as not being tracked. For example, a client may not desire that his excursions into gambling sites be of record. Alternatively or additionally, a client is preferably able to define what sites may obtain what information about him.

In some preferred embodiments of the invention, a client may be unable to access the contents of his own persona. Additionally or alternatively, the existence and/or usage of the persona is kept secret from the client and the persona is used to target the client with promotions and/or advertisements In a preferred embodiment of the invention, a persona of a client may be automatically generated by tracking the way a client interacts with the Internet.

In a preferred embodiment of the invention, a persona is divided into several layers of privacy. Some requesters may be able top access some parameters of the persona but not others. In a preferred embodiment of the invention, at least some of the personalization information is utilized as in a "black box", in that the persona server generates behaviors in response to queries but only on an individual basis, without letting out on the values of its internal parameters.

In a preferred embodiment of the invention, a persona server can generate and/or print reports. Such reports preferably include distribution of persona and/or mood use, statistics of site access, user satisfaction, statistics of persona parameters and/or values and/or any other information relating to the use of personalities. In some cases, a persona server may pull the information from remote sites, for example, from user computers at which persona are stored.

In a preferred embodiment of the invention, the persona server generates reports for WWW sites. Such reports may includes statistics of visitors, for example number of visitors and duration of connection. The report may be sent on a periodic basis, such as once a month or the report may be sent on demand. Preferably, the report includes statistics of the types and/or parameters of personas and/or moods of visitors.

In a preferred embodiment of the invention, a persona may be made anonymous, utilizing a personality server. Thus, when a user access a site which requires or prefers a persona, the user performs the access through a persona server. The persona server preferably generates a new persona identification for each such interaction, so that the accessed site has no way of associating a particular client and/or tracking a particular client's preferences.

Additionally or alternatively, user names and passwords required to access various sites may also be parameters of a persona. Thus, when a user accesses a site, that site can obtain required access codes from the persona, without bothering the user. As can be appreciated, different moods for a single user may have different access codes for a same site, for example, to control the behavior of the site to match a mood. Alternatively or additionally, the persona may include credit card information, deposit account and/or other account information which may be used for billing. In a preferred embodiment of the invention, the persona server includes a charge account for each persona, so that a persona can purchase services and/or goods on the Internet without sending a credit card number. The WWW site at which the goods were purchased is then reimbursed by the persona server, which bills the "persona".

Figure 3:
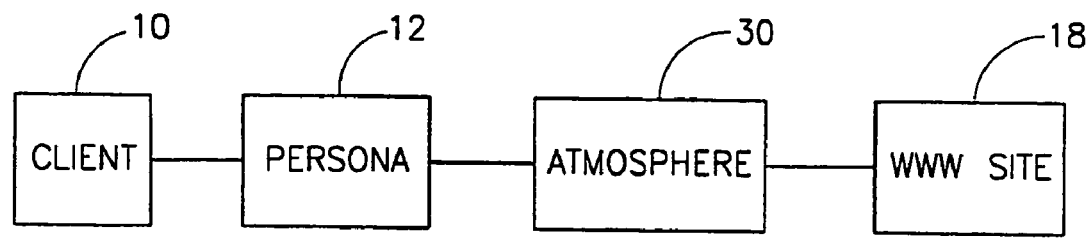
FIG. 3 illustrates the use of both an atmosphere and a persona in accordance with a preferred embodiment of the invention.

FIG. 3 illustrates the use of both an atmosphere 30 associated with a site and a persona 12 associated with a client in accordance with a preferred embodiment of the invention. While a client 10 may desire to present itself as a persona having various preferences, a WWW site 18 may also desire to present itself as meeting certain preferences and/or characteristics. Such a presentation of site 18 assists clients who are searching for the site. In a preferred embodiment of the invention, atmosphere 30 may define a complement of persona 12, so that matching persona will have a high affinity for the site. The atmosphere may be implemented in search engines, in indexes, as information stored at the site and/or using an atmosphere server. The atmosphere server provides, possibly at a fee to site 18, client 10 and/or an advertiser, the atmosphere of site 18.

An atmosphere may include a plurality of traits, for example, political slant, garishness, reading grade level, subjects of interest and in general the complements of parameters of a persona.

The atmosphere of a site may be evaluated on the fly using various methods described below. Additionally or alternatively, a client may grade a site. Such grading may become publicly available or it may be limited to the client or a group of clients. Additionally or alternatively, the persona server or the atmosphere server may evaluate a site. Additionally or alternatively, a separate server may provide a site evaluation service.

In a preferred embodiment of the invention, a site may be automatically evaluated by tracing the personas and/or moods of clients who visit the site and/or remain at the site for a significant amount of time. In a preferred embodiment of the invention, such tracing is performed by the site server. Additionally or alternatively, the tracing is performed by a persona server and/or an atmosphere server.

In a preferred embodiment of the invention, a plurality of sites are evaluated using a web-crawler. The web-crawler browses the Internet and sends an e-mail to the operator of each site. The e-mail preferably includes a questionnaire having open-ended and/or close-ended questions about the traits and/or atmosphere of the sight. An e-mail address for the questionnaire may be determined by searching the page for e-mail addresses, especially those having the form "info@.", "postmaster@ . . . ", "webmaster@ . . . ". In some preferred embodiments of the invention, only one address per domain name is used, unless a page has a title such as "home page" which indicates that the page is a root of a site.

Additionally or alternatively, to a site having a static atmosphere, a site may have a dynamic atmosphere. Thus a client may have to recheck the atmosphere and/or traits of a site periodically or before every access. Additionally or alternatively, a site can modify itself to match a desired atmosphere and be more acceptable to certain personas and/or moods. In one example, a site may have the option of using one of four color schemes: muted, respectable, garish and art-deco. In a preferred embodiment of the invention, a site may automatically select one of these schemes responsive to a persona which requests access to it. Additionally or alternatively, a site may change its design and/or presentation responsive to statistics of personas and/or moods which access the site. In one example, a site may modify one or more parameters of its design to match the personas of its clientele and/or of a desired clientele. In a preferred embodiment of the invention, such modification of a site is at least partly manual, by providing a site manager with statistics regarding the accessing of various persona and their parameters. Additionally or alternatively, a site may have predefined at least one parameter which automatically changes its display format and/or information filtering mechanism, for example using a predefined script, to match moods and/or personas which access the site.

In a preferred embodiment of the invention, an atmosphere of a site may be automatically evaluated by analyzing the content of a site, in addition to or instead of utilizing a client's reaction to the site or statistics of accessing the site. Various characteristics of a site may be automatically determined. Each of these characteristics and/or combinations thereof may be used to estimate values for traits and/or atmosphere. The characteristics preferably include one or more of:

(a) word length;
(b) whether certain words and/or phrases used by or associated with the site belong to certain groups, such as "academic words", "swear words", "adult words", "new-age words", "sports words", "baseball words";
(c) sentence complexity;
(d) density of displayed text;
(e) ratio between images and text;
(f) size of text;
(g) distribution of colors in image sand in background;
(h) number of links; number of links visited, date of last visit, by the client, by the persona, by the mood and/or by other moods, personas and/or clients;
(i) size of site;
(j) key-words presented by the site; and/or
(k) number of images; and/or
(l) number and/or type of multimedia files.

In a preferred embodiment of the invention, an atmosphere of a site is used to match advertisements even if a persona and/or mood are not known. For example, a macabre site will prompt the usage of dark advertisements. Alternatively or additionally, a complex site will prompt the use of complex advertisements.

Figure 4:
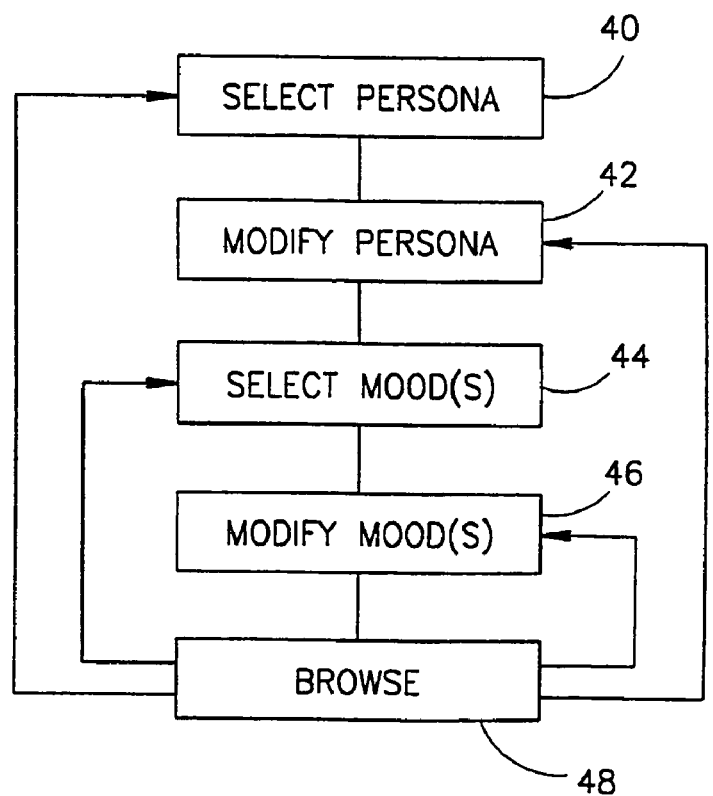
FIG. 4 is a flowchart of a process of persona and mood selection and update, in accordance with a preferred embodiment of the invention.

FIG. 4 is a flowchart of a process of persona and mood selection and update, in accordance with a preferred embodiment of the invention.

In a preferred embodiment of the invention, a client creates a persona by selecting an existing "standard" persona form a library of personas (40). Typically, the "standard" persona is modified by the client (42) to better match the client's exact desires. One or more moods may then be select from a library of moods, for the selected persona (44). In a preferred embodiment of the invention, a list of matching moods is associated for each persona. The matching moods are preferably moods which modify a persona in a most natural and/or useful manner. These moods may also be modified (46).

During browsing (48) a user may select a different persona or a different mood to better match his present frame of mind (left arrows). Additionally or alternatively, the personality(s) may be automatically modified. As described above the type of automatic modification and/or its parameters may also be a function of the personality.

In a preferred embodiment of the invention, a client selects a persona and/or a mood when entering the Internet or by entering a special site ad/or by running a special program on hi computer. In a preferred embodiment of the invention, each connection location may have associated therewith a default personality, for example a "work" personality and a "home" personality. When a client connects from an unknown computer, he can elect to assume an existing personality, for example the "home" personality.

In a preferred embodiment of the invention, when a client selects a personality at login, the client may also elect to modify the personality and/or mood. In one example, a user can indicate to the persona server that he is not alone in the room, so that sensitive information is not displayed. Alternatively or additionally, a client may define a "cover" personality, for example in case a boss walks in and is interested in what the client is doing.

In a preferred embodiment of the invention, a personality are updated responsive to one or more of the types and/or contents of sites that a client accesses, the time spent at each site (preferably with a deduction for connection time), activities performed at the sites and/or data downloaded from the sites. In a preferred embodiment of the invention, a client can indicate to the persona server if he is pleased with a particular site and/or displeased. Such an indication may also be used to modify the personality.

Additionally or alternatively, a persona server may generate a persona and/or a mood by providing a client with a questionnaire and filling in various parameters for a personality using the contents of the questionnaire.

In a preferred embodiment of the invention, a client base may already exist and what is necessary is to generate persona and/or moods for them. In such a case, a standard questionnaire may be sent to all the client base. Alternatively or additionally, a program may be loaded to the individual client to track Internet usage patterns. The program may continuously update a central location. Alternatively or additionally, the program may store its tracking results and update the center periodically. Alternatively or additionally, the program generates a locally stored persona and does not update a central location and/or updates the central location only with the persona. Such tracking may be performed with or without a user's knowledge. Alternatively or additionally, such tracking may be performed with or without user participation with the process. Alternatively or additionally, a database of user site access may already exist, either on individual client computers or at a centralized locations. In such a case, personas may be generated off-line by analyzing the Internet usage.

In some cases, off-line analysis of Internet usage may suggest more than one persona and/or more than one mood and/or a range of values for parameters of the mood. These variations may be identified, for example, by clustering of Internet access statistics. In one example, a user access profile may include time periods where a "rush" mood is evident and other periods where a "leisure" mood is evident.

Additionally or alternatively, a persona and/or a mood may be generated by tracing the Internet activities of a client. In a preferred embodiment of the invention, a client indicates at a start of an Internet session which personality he is emulating at the time.

In a preferred embodiment of the invention, a persona may be defined in a parametric manner. A client may modify a persona and/or a mood by multiplying various parameter values by factors. In one example, a client may decide that on a certain day he is 15% more conservative and 20% less interested in chess. The values of the parameters may also be a function of the time of day, day of the week, date and/or length of time logged on to the Internet.

In a preferred embodiment of the invention, various tools are provided for maintaining personas and/or moods. In a preferred embodiment of the invention, personalities may be stored, retrieved and/or electronically transmitted. In a preferred embodiment of the invention, personalities may be stored in a smart card and/or on a diskette. In a preferred embodiment of the invention, a central repository of personal portions and/or moods may be established for sale and/or trading of personalities. In some cases a group of clients may desire to have similar or identical moods.

In a preferred embodiment of the invention, two or more moods and/or persona may be compared to determine differences between them. Preferably, such comparison includes comparing the parameters and/or comparing the effects of using the moods and/or persona in various test cases. Additionally or alternatively, a client may rewind his Internet activities and perform them again using a different and/or modified personality. Additionally or alternatively, a client may perform activities in parallel using several personalities and compare the effects of the personalities.

In an example of utilizing personas for Internet commerce, a client may be a married business man, having two children, on teenage and one a toddler, a dog, an company office in London and family living in London. Also, the client is an exercise freak. All of the above information is preferably part of the client's profile. The client is looking for a hotel in London for business meeting. When such a client connects to WWW sites of hotel chains, he is not required to reenter personal information. Each site can offer an hotel which best suites his needs (near the office, shopping and family). Alternatively or additionally, each site can personalize its response to his query, for example, informing that it does or does not have an exercise spa. Alternatively or additionally, each site can personalize its promotions, for example, offer a low-rate accommodation for an accompanying teenage family member. Alternatively or additionally, the site can personalize advertisements, for example display advertisements for quality dog food available in the London region and/or dog sitters.

It should be appreciated that the above description of personalization has been focused on an Internet application. However, it should be appreciated that the same principles may be applied to any search mechanism and/or large database. Nevertheless, various preferred embodiments of the invention are particularly useful for the Internet due to the type of indexing of the Internet, the type of browsing practiced in the Internet, the Internet's social implications and the very large number of authors in the Internet.

It will be appreciated that the above described methods of Internet personalization may be varied in many ways, including, changing the order of steps, which steps are performed on-line and which steps are performed off-line. In addition various distributed and/or centralized configurations may be used to implement the above invention, preferably utilizing a variety of software tools. In addition, a multiplicity of various features, both of method and of devices have been described. It should be appreciated that different features may be combined in different ways. In particular, not all the features shown above in a particular embodiment are necessary in every similar preferred embodiment of the invention. Further, combinations of the above features are also considered to be within the scope of some preferred embodiments of the invention. Also within the scope of the invention are computer readable media on which software, for performing part or all of a preferred embodiment of the invention, are written. It should also be appreciated that many of the embodiments are described only as methods or only as apparatus. The scope of the invention also covers hardware and/or software adapted and/or designed and/or programmed to carry out the method type embodiments. In addition, the scope of the invention includes methods of using, constructing, calibrating and/or maintaining the apparatus described herein.

It will be appreciated by a person skilled in the art that the present invention is not limited by what has thus far been described. Rather, the scope of the present invention is limited only by the following claims. When used in the following claims, the terms "comprises", "comprising", "includes", "including" or the like means "including but not limited to".

The invention claimed is:

1. A method of a user interacting with an Internet site managed by a first entity, comprising:
   (a) receiving at the site, from a user of a remote computer connected to the Internet, a request for an Internet page;
   (b) receiving at the site, a predefined site-independent user profile record of the user transmitting the request, provided by a second entity not associated with the first entity;
   (c) obtaining, responsive to the request, information content of the Internet page;
   (d) selecting through an atmosphere server associated with the site a trait defining characteristics for a display format of an Internet page to the user that is a complement to at least one attribute of the user profile record provided to the site and used by said atmosphere server; and
   (e) responding of the site to the request, with a page presentation of the provided information content of the requested Internet page in a display format defined in accordance with the trait selected through the atmosphere server responsive to the user profile record.

2. A method according to claim 1, wherein selecting the display format comprises modifying a display layout.

3. A method according to claim 1, wherein selecting the display format comprises modifying a level of detail shown.

4. A method according to claim 1, wherein selecting the display format comprises selecting data to be displayed.

5. A method according to claim 1, wherein selecting the display format responsive to the user profile comprises modifying a display format of a browser of the client.

6. A method according to claim 1, wherein the user profile records are managed at least partially by tracking interactions of the user with an Internet and analyzing the tracked interactions to determine at least a part of the user profile.

7. A method according to claim 6, wherein said tracking comprises tracking at a computer from which the user accesses the Internet.

8. A method according to claim 6, wherein said tracking comprises tracking at a tracking computer which tracks a plurality of users, accessing the Internet from different client stations.

9. A method according to claim 8, wherein said tracking computer is physically remote from a computer hosting the site.

10. A method according to claim 6, wherein said tracking comprises tracking at a tracking computer which tracks access to a plurality of different unrelated web sites.

11. A method according to claim 1, wherein providing the information content of the Internet page comprises providing the information content of the Internet page without relation to the user profile of the user transmitting the request.

12. A method according to claim 1, wherein the selected display format includes at least one non-information-content attribute selected responsive to the user profile.

13. A method according to claim 12, wherein the at least one attribute of the display format determined responsive to the user profile comprises one or more display colors.

14. A method according to claim 12, wherein the at least one attribute of the display format determined responsive to the user profile comprises an image quality.

15. A method according to claim 12, wherein the at least one attribute of the display format determined responsive to the user profile comprises a size, amount or density of displayed text.

16. A method according to claim 1, wherein transmitting the request comprises transmitting along with the user profile record.

17. A method according to claim 1, wherein responding to the request comprises responding by the site, which selects the display format.

18. A method according to claim 1, wherein responding to the request comprises providing the information content by the site, and selecting the display format at least partially by a persona server, separate from the site, which provides the presentations to the users.

19. A method according to claim 1, comprising repeating (a), (b), (c) and (d) for a plurality of unrelated sites using a single user profile.

20. A method according to claim 1, comprising repeating (a), (b), (c) and (d) for a plurality of user profile records and a single site, wherein at least some of the responses to the requests differ at least in their display formats.

21. A method according to claim 20, wherein providing the information content comprises providing the same information content for a plurality of the users.

22. A method according to claim 20, wherein providing the information content comprises providing different information content including different search results, for a plurality of the users.

23. A method according to claim 20, wherein the display formats selected responsive to the user profile records of at least two of the users differ in their level of detail.

24. A method according to claim 20, wherein the display formats selected responsive to the user profile records of at least two of the users differ in a percentage of image data that they include for one or more of their images.

25. A method according to claim 20, wherein the display formats selected responsive to the user profile records of at least two of the users differ in their colors.

26. A method according to claim 20, wherein the display formats selected responsive to the user profile records of at least two of the users differ in their spatial layout.

27. A method according to claim 20, wherein the display formats selected responsive to the user profile records of at least two of the users differ in a size, amount or density of displayed text.

28. A method according to claim 20, wherein the display formats selected responsive to the user profile records of at least two of the users differ in a number or percentage of non-textual objects.

29. A method according to claim 20, wherein the display formats selected responsive to the user profile records of at least two of the users differ in the type of words they use.

30. A method according to claim 20, wherein the display formats selected responsive to the user profile records of at least two of the users differ in a ratio between images and text in the page.

31. A method according to claim 1, wherein providing the user profile record of a user comprises providing a record at least partially determined for one or more other users.

32. A method according to claim 1, wherein providing the user profile record comprises providing by a proxy through which the request for the Internet page is provided to the site.

33. A method according to claim 1, wherein providing the user profile record comprises providing a user profile record generated in a manner transparent to the user.

34. A method according to claim 1, wherein the display format is selected responsive to at least one attribute of the user profile record, which is independent of the information content of the site.

* * * * *